(12) United States Patent
Morath

(10) Patent No.: US 8,805,638 B2
(45) Date of Patent: Aug. 12, 2014

(54) SENSOR FOR MEASUREMENT OF DESIRED VARIABLE OF MEDIUM

(75) Inventor: Erwin Morath, Lauterach (DE)

(73) Assignee: Liebherr-Werk Ehingen GmbH, Ehingen/Donau (DE)

( * ) Notice: Subject to any disclaimer, the term of this patent is extended or adjusted under 35 U.S.C. 154(b) by 568 days.

(21) Appl. No.: 12/977,252

(22) Filed: Dec. 23, 2010

(65) Prior Publication Data

US 2011/0153277 A1   Jun. 23, 2011

(30) Foreign Application Priority Data

Dec. 23, 2009   (DE) .................... 20 2009 017 430 U

(51) Int. Cl.
*G01D 1/00* (2006.01)
(52) U.S. Cl.
USPC ............ 702/127; 702/85; 702/138; 702/183; 702/188
(58) Field of Classification Search
USPC .................. 702/33, 35, 47, 98, 127, 188, 193
See application file for complete search history.

(56) References Cited

U.S. PATENT DOCUMENTS

| 6,434,476 | B1 * | 8/2002 | Zagone ......................... 701/115 |
| 2004/0015282 | A1 * | 1/2004 | Babala et al. .................. 701/70 |
| 2006/0178857 | A1 * | 8/2006 | Barajas ......................... 702/189 |
| 2007/0282459 | A1 * | 12/2007 | Schafer et al. .................. 700/4 |

FOREIGN PATENT DOCUMENTS

| DE | 19647131 | C2 | 5/1998 |
| DE | 10242128 | A1 * | 3/2004 |
| DE | 10305036 | A1 | 8/2004 |
| DE | 102006005848 | A1 | 8/2006 |
| DE | 102006005393 | A1 | 8/2007 |
| DE | 102007042043 | A1 | 3/2009 |

OTHER PUBLICATIONS

Translation of Abstract of DE19647131.
Translation of Abstract of DE102007042043.
Translation of Abstract of DE102006005393.
Translation of Abstract of DE10305036.
Translation of Abstract of DE10242128.
Search Report for DE202009017430.1 (Priority German Patent Application) from German Patent and Trademark Office.

* cited by examiner

*Primary Examiner* — John Breene
*Assistant Examiner* — Yaritza H Perez Bermudez
(74) *Attorney, Agent, or Firm* — The PL Law Group, PLLC

(57) ABSTRACT

A sensor for measurement of a desired variable of a medium includes a sensor having at least two measured value pick-ups and at least two processing units within a sensor housing. The measured value pick-up is defined as a part of the sensor which directly responds to a measured variable to be detected. Each measured value pick-up may be connected via a signal line to each processing unit so that the signal value representing the measured value can be transferred to the processing unit. The at least two measured value pick-ups pick up at least two measured values independently of one another and transfer them to their connected processing units. With this arrangement, the effective actual values of the measurement value to be checked is applied to both measured value picks-ups without time delay.

17 Claims, 3 Drawing Sheets

PRIOR ART

SENSOR FOR MEASUREMENT OF DESIRED VARIABLE OF MEDIUM

CROSS-REFERENCE TO RELATED APPLICATION AND CLAIM OF PRIORITY

This application claims the benefit of German Utility Model Application No. 20 2009 017 430.1, filed on Dec. 23, 2009, in the German Patent and Trademark Office, the disclosures of which are incorporated herein in their entirety by reference.

BACKGROUND

1. Field of the Invention

The present invention relates to a sensor for measuring a desired variable.

2. Description of the Related Art

To cope with the strict demands on safety in the handling of complex machinery, the installation of a component of the machinery may be redundant or diverse.

In the case of a sensor, since the sensor under certain circumstances takes up relevant measured variables for the safe operation of the machine, redundant sensors may be installed for a proper working of the controller of a machine, particularly in the data transfer from the sensor to the processor. Redundancy may also be necessary in this area to guarantee the demanded safety conditions. A possible malfunction of individual components of the total measurement chain can be detected on the basis of the redundantly present measured results.

An exemplary realization of such a sensor-based measurement system of a machine whose sensor arrangement is of redundant design is shown in FIGS. 1a to 1c. The sensor-based measurement system has a conduit 1 conducting any desired medium, wherein the pressure of the medium present in the conduit 1 is detected by the sensor. The two measurement connections 2, 12, which are arranged mutually spaced apart along the conduit 1, serve this purpose. The medium within the conduit 1 to be checked is fed via the measurement connections 2 and 12 to the two measurement devices 3 and 13 which are respectively connected via the signal line 4 and 14 to a respective own processor unit 6 and 16.

As soon as a pressure pulse having an actual value in accordance with FIG. 1b occurs at the input of the conduit 1, it is continued in the conduit 1. Since the two measurement connections 2, 12 are mutually spaced apart, the pressure pulse reaches the measurement device 3 via the measurement connection 2 at the time $t_2$ (see FIG. 1b) and reaches the measurement device 13 via the measurement connection 12 at the time $t_3$.

Both the measurement devices 3 and 13 work independently of one another since no uniform clocking is provided. The measurement devices 3, 13 which can be seen from FIG. 1c form the analog electrical signals representing the actual value. The signals are transmitted via the two signal lines 4 and 14 to the two processor units 6 and 16. The two processor units 6 and 16 work independently of one another and thus not synchronously. The processors 6, 16 thus determine the measured values MW1 and MW2 corresponding to the actual value with a time offset with reference to the electrical values provided via the lines 4, 14.

To detect possible faults of the two independent measurement apparatus, a measured value comparison 50 is initiated between the two processor units 6 and 16. A substantial problem of the conventional sensor arrangement is caused by that the individual measured values MW1 and MW2 generated in dependence on time on the basis of the time difference 51 result in considerable measurement uncertainties. These measurement uncertainties must be observed in the comparison 50 of the measured results in that the region for the deviations from one another of the two measured values MW1 and MW2 to be tolerated is made larger. A malfunction of the conventional measurement apparatus is only diagnosed after an exceeding of the deviation tolerances.

For the foregoing reasons, there is a need for a measurement arrangement which provides greater security and a finer reaction possibility to possible measurement deviations.

SUMMARY

According to an aspect of the present invention, there is provided a sensor which allows substantially smaller tolerance limits.

According to an aspect of the present invention, there is provided a sensor for measurement of a desired variable of a medium, including: a sensor housing; a specimen feed in the sensor housing to receive the medium to be detected; and at least two measured value pick-ups and at least two processing units each arranged redundantly pairwise with respect to one another and/or diversely in the sensor housing.

According to an aspect of the present invention, a sensor includes: a sensor housing having a specimen feed to receive a medium to be detected; a first measured value pick-up housed in the sensor housing, the first measured value pick-up measuring a variable to obtain a first measured value; a second measured value pick-up housed in the sensor housing, the second measured value pick-up measuring a variable to obtain a second measured value, the first and second measured value pick-ups mounted in the specimen feed to be spaced apart from each other with a substantial identical distance from an entry of the specimen feed; a first processing unit having a first input and a first output, the first input receiving the first measured value from the first measured value pick-up; and a second processing unit having a second input and a second output, the second input receiving the second measured value from the second measured value pick-up, the first and second processing units coupled to each other via a signal connection to communicate the first and second measured value pick-ups; wherein at least one of the first processing unit and the second processing unit further has a comparing unit to compare the first measured value with the second measured value, the first processing unit and the second processing unit store one of the first and second measured value in the first output and the second output when a deviation of the compared first and second measured values is within a preset tolerance limit, and mark one of the first and second measured value as faulty and store the marked value from the first or second output when a deviation of the compared first and second measured values is not within the preset tolerance limit, According to an aspect of the present invention, the variable is pressure, angle, rotation, inclination, length, distance, noise, brightness, moisture, direction or level.

According to an aspect of the present invention, the sensor further includes a secondary sensor detecting a disturbance variable caused by an environment and transmitting a detected value of the disturbance variable to at least one of the first and second processing units so that disturbance on the sensor is compensated by the measured value provided by the secondary sensor.

According to an aspect of the present invention, the first and second processing units are coupled to a bus system.

According to an aspect of the present invention, a sensor includes: a sensor housing having a specimen feed to receive a medium to be detected; a first measured value pick-up measuring a variable to obtain a first measured value; a second measured value pick-up measuring a variable to obtain a second measured value, the first and second measured value pick-ups mounted in the specimen feed to be spaced apart from each other at positions where the first measured value and the second measured value are substantially the same when the sensor is plausible; a first processing unit having a first input receiving the first measured value from the first measured value pick-up and a first output coupled to a bus system; and a second processing unit having a second input receiving the second measured value from the second measured value pick-up and a second output coupled to the bus system, the first and second processing units coupled to each other via a signal connection to communicate the first and second measured value pick-ups; wherein at least one of the first processing unit and the second processing unit has a comparing unit to compare the first measured value with the second measured value, the first processing unit and the second processing unit store one of the first and second measured value in the first output and the second output when a deviation of the compared first and second measured values is within a preset tolerance limit, and mark one of the first and second measured value as faulty and store the marked value when a deviation of the compared first and second measured values is not within the preset tolerance limit.

According to an aspect of the present invention, the first and second processing units work on the basis of a common clock source.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

The present invention will now be described more specifically with reference to the following Embodiments. It is to be noted that the following descriptions of preferred Embodiments of this invention are presented herein for purpose of illustration and description only; it is not intended to be exhaustive or to be limited to the precise form disclosed.

According to an embodiment of the present invention, a sensor has at least two measured value pick-ups and at least two processing units within a sensor housing. The measured value pick-up is defined as a part of the sensor which directly responds to a measured variable to be detected. Each measured value pick-up may be connected via a signal line to each processing unit so that the signal value representing the measured value can be transferred to the processing unit.

To increase the reliability or safety of the sensor, both the measured value pick-ups and the processing units are made redundant and/or diverse. The at least two measured value pick-ups pick up at least two measured values independently of one another and transfer them to their connected processing units. In accordance with an embodiment of the present invention, the arrangement of at least two measured value pick-ups in a sensor housing with one specimen feed guarantees that the effective actual values of the measurement value to be checked is applied to both measured value picks-ups without time delay. The measured value pick-ups and/or the processing units are preferably made diverse.

Figure 1A:
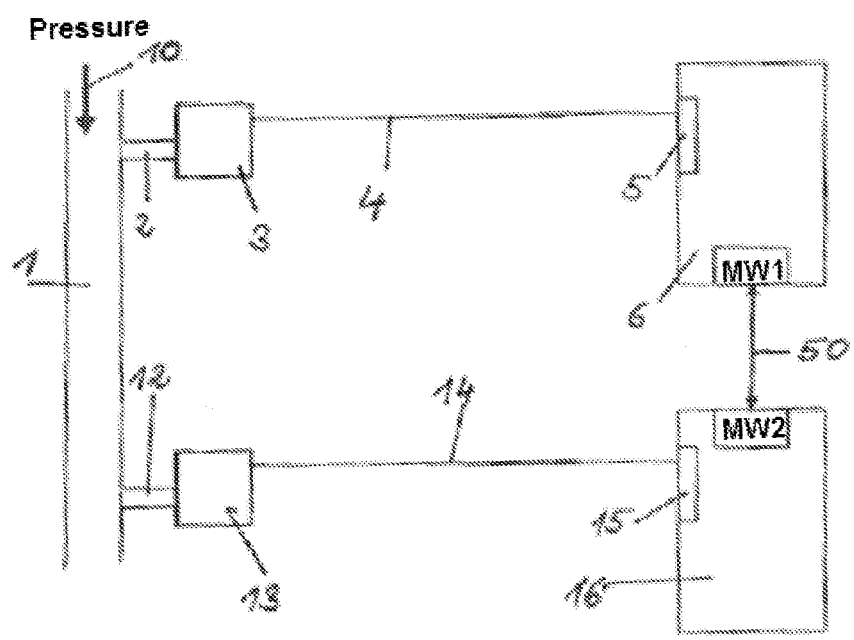
FIGS. 1a to 1c illustrate a conventional redundant sensor system and two associated measurement diagram representations of individual measured values.
Figure 1B:
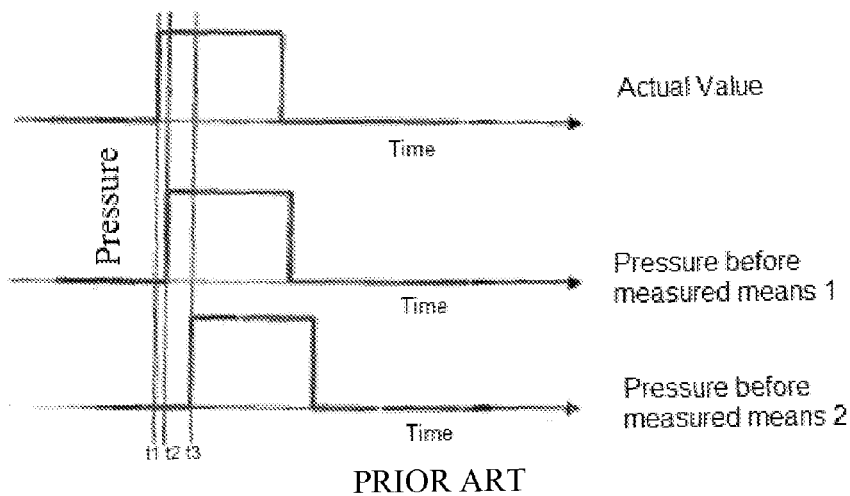
Figure 1C:
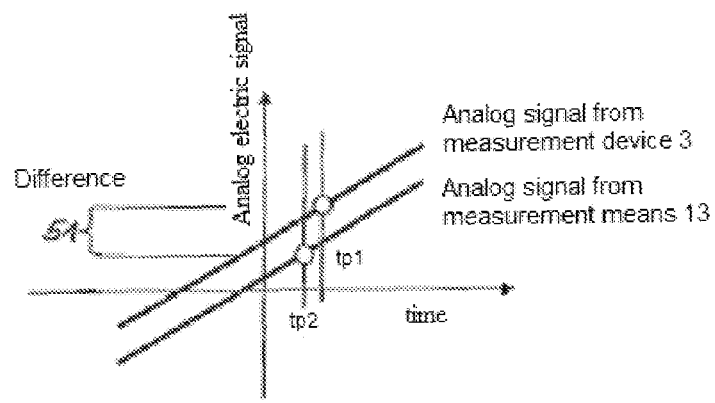

In contrast thereto, the sensor system known in the conventional art follows the approach of arranging two completely independent sensors to the conduit via two separate specimen feeds 2, 12. (See FIG. 1) Due to the arrangement of the sensors spatially distanced from one another, the effective actual value of the medium only reaches the sensors with a time lag, which results in substantial deviations in the detected measured values.

The minimally spaced arrangement of the two measured value pick-ups in the sensor housing in accordance with an embodiment of the present invention reduces the time offset of the detected measured values substantially, or practically precludes the time offset. All the measured value pick-ups are preferably arranged with the same distance from the entry of the specimen feed. Accordingly, a change in the measured variable is detected simultaneously in time at all the measured value pick-ups. Furthermore, the sensor in accordance with an embodiment of the invention represents a simple implementation of a redundantly designed sensor system since the redundancy is already integrated in the sensor housing. A complex arrangement of a plurality of separate independent sensors is no longer necessary.

Particularly, the at least two measured value pick-ups are arranged directly next to one another within or in the end region of the specimen feed of the sensor. Alternatively, the measured value pick-ups may be attached to be oppositely disposed within the specimen feed. The smaller the spatial distance between two measured value pick-ups is, the smaller the time-delayed detection of the actual value of the measured variable is. The time offset of the actual values between the pick-ups can be neglected due to the arrangement in accordance with the embodiment of the present invention.

If the measurement result is dependent on external disturbance variables, one or more secondary sensors may be further arranged within the sensor housing. For example, temperature sensors or sensors for detecting the atmospheric pressure may be arranged. The measured values provided by the secondary sensors in particular flow to the processing unit. Advantageously, external influences on the sensor can hereby be compensated by the measured data provided by the secondary sensors.

The at least two processing units may be coupled to one another. The at least two processing units preferably work on the basis of a common clock source or use separate clock sources which can be synchronized with one another. The use of a common time base or the synchronized signal processing of the processing units reduces or optimizes the time offset of the measured values applied to the outputs of the processing units.

To communicate the processed measured values further to a central unit, the sensor, in particular at least one processing unit, is or can be coupled to a bus system, in particular a controller-area network (CAN) bus system, a Liebherr system bus or an Ethernet based bus system. The transmitter and/or receiver unit preferably integrated in the processing unit for this purpose applies the determined measured values or the processed measured signals to the system bus. It may be provided that the processing unit checks the transmitted signal for correctness parallel to the transmission process. Accordingly, the processing unit simultaneously receives its transmitted signal. It is possible that all processing units of the sensor are connected to the bus system. In this case, a processing unit transmits its signal via the bus and all the other processing units also receives the transmitted signal applied to the bus by the one processing unit and check it for correctness or make a comparison between the bus signal and their expected value. In the case of an error detection, at least one processing unit preferably applies the corresponding bus signal to ground for a certain period, in particular 512 μs. This corresponds to the corresponding timeout of the transfer protocol of the bus system used, whereby all the signals applied to the bus are declared invalid or are rejected within the receiver units.

The mutual exchange of the measured values or other data of the individual processing units is preferably realized via the signal connection between the processing units. Consequently, each processing unit provides their determined measured value to one or all the other processing units. A comparing unit may be provided within at least one processing unit to compare at least one first measured value with at least one of the other measured values. At least one processing unit may compare its own measured value with the measured values of all the other connected processing units.

According to an embodiment of the present invention, the comparing unit may be provided such that a plausibility check, in particular a cross-comparison, can be carried out between at least two measured values. If the deviations are within definable tolerance limits, the measurement is classified as plausible and the at least two processing units agree on a uniform measured value applying to all or to at least some processing units. This is then stored as a binary value in the output region of all or some of the processing units. For example, two processing units compare their measured values with each other. In the case of only small tolerable deviations, the first processing unit stores its measured value in the output region and the second or all the other processing units reject their own measured values and instead store the uniform measured value of the first processing unit in their output regions. The bit patterns of the stored values are accordingly identical in all output regions.

If the deviations of the two compared measured values are outside the definable tolerance range, the measurement result of at least one processing unit can be marked as faulty. The measured values marked as faulty can be stored in the output region of the at least two processing units and can optionally be transmitted via a connected bus system. A receiver can conclude a malfunction of the sensor on the basis of the marking.

The comparing unit may be realized by a programmable microprocessor or digital signal processor (DSP). The coupling of the processing units or of the microprocessors is given by the central clock feed of the microprocessors. The synchronization of the microprocessors minimizes the time offset between the measured values since all processing operations within the microprocessors can be carried out simultaneously or synchronously with one another. The individual actual values of the measured variable can accordingly be evaluated and be outputted substantially simultaneously within the microprocessors.

According to an embodiment of the present invention, a unit for encoding or packaging the measured value to be transmitted may be provided. The unit for encoding or packing the measured value may use suitable data processing algorithms on the digitized measured value, such as cyclic redundancy check (CRC) and/or Chinese remainder theorem (CRT) algorithms. The measured value is accordingly transmitted in encoded form via a connected bus system. On the receiver side, a unit for decoding or unpackaging may be provided to decode or unpackage the encoded or packaged value, and may detect and correct processing errors of the measured value which occur in encoding or packing.

In an embodiment of the present invention, the sensor housing has a threaded connection. The specimen feed may have a thread, and the sensor may be connected via the threaded connection to any desired sample having the value to be measured.

It generally applies that such a sensor has at least two measured value pick-ups for any desired variables to be detected. The sensor may be suitable for measuring one or more different variables such as pressure, angle, rotation, inclination, length, distance, noise, brightness, moisture, direction or level. The compatibility of the sensor is dependent on the installed measured value pick-up(s). The specimen feed may be expediently adapted to the variable to be detected or to the medium. The type of measured value processing is preferably identical in all sensors. All the sensors preferably have at least two measured value pick-ups and/or processing units arranged redundantly or diversely with respect to one another. Examples of the sensor in accordance with the present invention are, but not limited to, a rope length encoder, a laser sensor, a rotational angle transducer, an inclinometer and a length meter via a rotary encoder.

Figure 2:
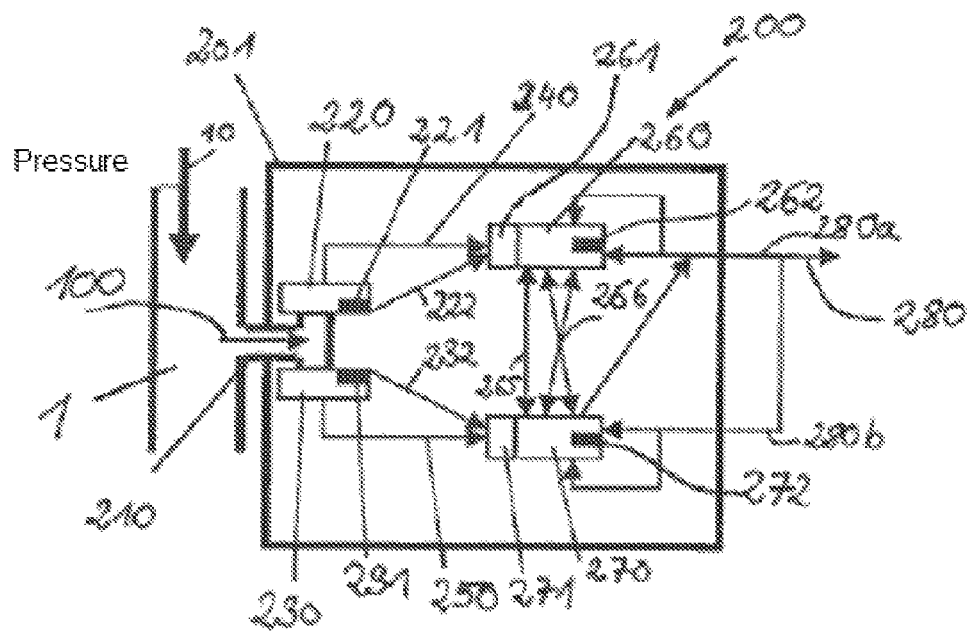
FIG. 2 shows a pressure sensor according to an embodiment of the present invention.

FIG. 2 shows the schematic design of an embodiment of the sensor 200 in accordance with the present invention. In the embodiment of FIG. 2, the sensor 200 works as a pressure sensor for detecting the hydraulic pressure of the medium within the conduit 1. The thread at the sensor housing 201 of the sensor 200 is screwed into the matching screw connection of the conduit 1. When the conduit 1 is filled with hydraulic oil or with a similar pressure medium, the space of the specimen feed 210 is also filled up to the measured value pick-ups 220, 230 arranged therein. The measured value pick-ups 220, 230 convert the detected measured pressure variable (actual value) within the specimen feed 210 into corresponding electric signals which are supplied to the inputs 261, 271 of the two processing units 260, 270 via the two signal lines 240, 250. The two measured value pick-ups 220, 230 may be spaced apart from each other, and the distances from the entry of the specimen feed 210 are substantially identical to each other so that the identical measured values are obtained simultaneously at both the measured value pick-ups 220, 230.

Each measured value pick-up 220, 230 may have a respective secondary sensor 221, 231 for detecting disturbance variables caused by the environment. A plurality of secondary sensors are also possible for detecting one disturbance variable or different disturbance variables such as temperature or air pressure influences. Due to the close proximity of the secondary sensors 221, 231, one secondary sensor 221 or 231 would also be technically sufficient at the cost of redundancy. The determined disturbance influences are transmitted via the signal lines 222, 232 to the inputs 261, 271 of the responsible processing units 260, 270 for disturbance variable compensation. Both the secondary sensors 221, 231 may be temperature sensors to compensate temperature-dependent measurement fluctuations of the sensor 200. Alternatively, or in addition, the secondary sensor 221, 231 may be a pressure sensor which detects the atmospheric pressure present on the sensor 200 or within the sensor housing 201 and forwards it for compensation.

During the operation of the sensor 200, the measured value pick-ups 220, 230 as well as the secondary sensors 221, 231 deliver continuously measured signals via the signal lines 240, 250, 222, 232 to the corresponding inputs 261, 271 of the two processing units 260, 270.

The two processing units 260, 270 may have an integrated circuit arrangement which may be a programmable microprocessor or digital signal processor (DSP). The processing units process the electrical measured signals of the measured value pick-ups 220, 230 and of the secondary sensors 221, 231 transmitted to the inputs 261, 271. The processing units 260, 270 perform the analog-to-digital conversion of the applied values, and each processing unit 260, 270 provides its own converted measured value to the other processing unit via the connection 266. A plausibility check of the present measured values by the method of cross-comparison takes place within the processing units 260, 270 to monitor the proper operation of the sensor. Since the respective measured values are applied to the inputs 261, 271 of the two processing units in a time-dependent and continuous manner, the two processing units 260, 270 expediently work with a common time basis 265. Both the processing units either are fed by a common clock source or use separate clock sources which are synchronized with one another. According to an embodiment of the present invention, a common time basis 265 is used.

If the deviations of the measured values do not exceed the defined tolerance limits, the measurement is classified as plausible. A measured value, for example, the measured value from the processing unit 260, is picked up as the measured value by both processing units 260, 270 and is then stored in the output region 262, 272 for transfer. Identical bit patterns are thus ensured in the output regions 262, 272 during the sensor operation without malfunction after the digitizing and the comparison of the measured values. The transfer of the unified measured value is sufficient for the forwarding of the sensor values to the a central evaluation unit or controller of a machine.

If the deviations are outside the preset tolerance range, the measured values are marked as faulty and are stored together with the marking in the output region 262, 272 of the two processing units 260, 270.

The sensor 200 can be connected to a bus system for the transfer of the sensor-detected measured values of the sensor 200 to any desired apparatus. The sensor 200 in accordance with an embodiment of the present invention shown in FIG. 2 can be coupled to the Liebherr system bus known from the document DE 196 47 131 C2 which is incorporated herein by reference.

The two processing units 260, 270 are linked via the branch buses 280a, 280b to the bus line 280 of the system bus via the two branch buses 280a, 280b within the housing 201.

As soon as a measured value for the pressure in the conduit 1 is required by the central unit of a controller, the central unit transmits a signal via the bus 280 to the two processing units 260, 270 of the sensor 200. The processing unit 260 responds to the received signal with the transmission of the measured value stored in the output region 262. The transfer takes place via the connected bus system using the transmission protocol known to the transmitter and receiver unit of the processing unit 260. During the transmission process, the processing unit 260 simultaneously checks the transmitted signal stored on the bus for correctness. The processing unit 270 proceeds analogously, wherein it checks the signal applied to the system bus by the processing unit 260 for correctness, in that the signal is compared with its expected value, that is, with the measured value stored in the output 272. If one of the processing units 260, 270 to be checked identifies a transmission error, the processing unit 260, 270 makes the protocol invalid; in the Liebherr system, for example, by applying the bus signal to ground for a specific time, in particular 512 µs. The time span characterizes a corresponding timeout of the Liebherr system bus protocol so that all the transmission signals transmitted by the bus are rejected by the individual receiver units. The transmission cycle is repeated or starts with the transmission of the following measured values.

Figure 3:
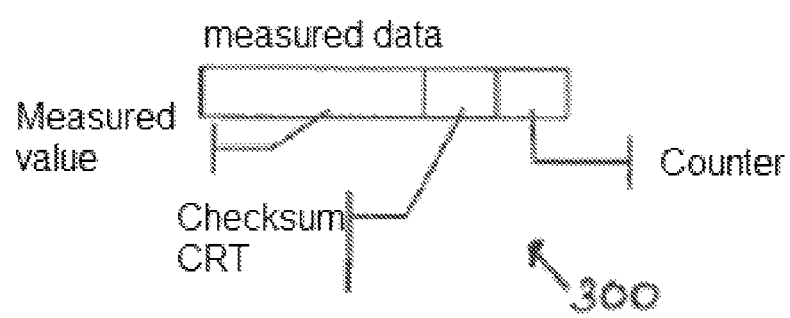
FIG. 3 shows the transfer protocol of the sensor shown in FIG. 2.

Before the measured values are transmitted via the connected bus system using the bus protocol, the data packet 300 of FIG. 3 is formed. To encode the measured value, a suitable security algorithm is used which includes the checksum formation via the measured value and the use of a restoration algorithm. A combination of CRC and CRT may be named as an example. A counter is added to the data packet 300 to identify the measured value or the data packet 300. The packaging or encoding of the measured values increases the safety since transmission errors of the measured values can be recognized on the receiver side and can preferably be remedied.

The aforesaid tasks of the processing units 260, 270 can be associated as desired therewith. Embodiments are conceivable in which a processing unit only acts as an observer. An alternating association of the individual tasks to the respective processing units 260, 270 is equally possible.

Since the two measured value pick-ups 220, 230 are arranged very close to one another within the specimen feed 210 and since the position was ideally selected, a substantially identical actual value of the pressure present within the conduit 1 is applied to both measured value pick-ups 220, 230. The pressure can simultaneously be measured, optionally on demand. Furthermore, the measured value deviation is reduced as largely as possible by the time synchronization of the two processing units 260, 270 in a fully operational sensor operation. The tolerance limits can hereby be defined as very small so that even smaller critical measured deviations within the sensor 200 can be detected and a subsequent error analysis can be started.

The embodiment of the sensor 200 in accordance with the invention serves the technical measurement detection of a pressure within the conduit 1. Such an embodiment of the sensor in accordance with the invention is, however, not restricted to the measurement of the parameter of pressure. Further embodiments of the sensor 200 in this respect provide the measurement of an angle, rotation, inclination, length, distance, noise, brightness, moisture, direction or level. For this purpose, only the measured value pick-ups 220, 230 need to be adapted and the specimen feed 210 needs to be modified according to the corresponding types of the measurements. Possible embodiments are a rope length encoder, a laser sensor, an angle of rotation transducer, an inclinometer and a length meter via a rotary encoder.

In accordance with another embodiment of the present invention, the sensor may be an inclination sensor. The sensor topology can be divided into two channels which are each formed by a measured value pick-up and a processing unit. The two separately arranged measured value pick-ups permit a detection of the inclination about two axes and transmit their measured signals for evaluation to their associated processing unit. The processing unit of the first channel takes over the control of the bus connection and the data transmission of the sensor. The second processing unit acts only as a monitoring member which can interrupt the data transmission of the sensor under certain circumstances.

To achieve a diversity of the inclination sensor, at least the two measured value pick-ups may be made as diverse. In an embodiment, the inclination sensor includes a measured value pick-up of the component type SCA 103T which is connected via an SPI interface to its processing unit. A component of the series ADIS16003 is used as the second measured value pick-up.

Such an inclination sensor is advantageously based on the principle of the MEMS (micro-electromechanical system) technology for inclination detection. The sensor system of the inclination sensor measures the force effect of the acceleration due to gravity on flexibly supported plates of a capacitance. Since the effective force vector changes with the relative inclination toward the center of the earth, a corresponding angle can be determined To increase the precision of the measurement, two measured value pick-ups rotated by 180° are used in the measurement channel per axis and their measured values are differentially evaluated. The output and calculation of the absolute angle of inclination takes place with a measurement resolution of 0.02° for the center and with a measurement resolution of 0.4° in the range of ±25°.

One or more displays, for example, light emitting diodes (LEDs), which are preferably arranged at the sensor housing serve to signal different sensor states. A status byte which can be transferred together with the measured value serves to characterize the then current sensor state. In the error case, the status byte is complemented by the corresponding error code.

While the invention has been described in terms of what is presently considered to be the most practical and preferred Embodiments, it is to be understood that the invention needs not be limited to the disclosed Embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A sensor for measurement of a desired variable of a medium, comprising:
    a sensor housing;
    a specimen feed in the sensor housing to receive the medium to be detected; and
    at least two measured value pick-ups comprised of a first measured value pick-up and a second measured value pick-up in the sensor housing, the first measured value pick-up receiving the medium from the specimen feed and measure the desired variable of the medium to obtain a first measured value, the second measured value pick-up receiving the medium from the specimen feed and measure the desired variable of the medium to obtain a second measured value;
    at least two processing units in the sensor housing, said at least two processing units comprising a first processing unit receiving the first measured value pick-up from the first measured value pick-up and a second processing unit receiving the second measured value from the second measured value pick-up, said at least two processing units mutually exchanging the measured variables via a connection, at least one of said at least two processing units cross-comparing the first and second measured values; and
    at least one secondary sensor selected from the group consisting of a temperature sensor, a pressure sensor and a combination thereof arranged within the sensor housing, wherein the at least one secondary sensor is detecting a disturbance variable caused by an environment and transmitting a detected value of the disturbance variable to at least one of the first and second processing units so that disturbance on the sensor is compensated by the measured value provided by the secondary sensor.

2. A sensor in accordance with claim 1, wherein the measured value pick-ups are arranged spatially next to one another in the specimen feed.

3. A sensor in accordance with claim 1, wherein said at least two processing units are coupled to one another in the sensor housing.

4. A sensor in accordance with claim 1, wherein at least one of said at least two processing units is coupled to a bus system selected from the group consisting of a controller-area network (CAN) bus system, a Liebherr system bus, an Ethernet based bus system and a combination thereof.

5. A sensor in accordance with claim 1, wherein said at least two processing units include a comparing unit for comparing at least one measured value with at least one of another measured value obtained from said at least two measured value pick-ups.

6. A sensor in accordance with claim 5, wherein the comparing unit carry out a plausibility check between said at least one measured value with said at least one of another measured value.

7. A sensor in accordance with claim 5, wherein one of the first and second measured values is transferred from said at least two processing units.

8. A sensor in accordance with claim 7, wherein the transferred one of the first and second measured values is marked as faulty by the processing units if the deviation of the individual measured values of the processing units exceeds a defined tolerance limit.

9. A sensor in accordance with claim 5, wherein the comparing unit is a microprocessor with a synchronized time basis.

10. A sensor in accordance with claim 1, further comprising a unit for encoding or packaging the measured value to be transferred.

11. A sensor in accordance with claim 1, wherein the sensor housing has a threaded connection.

12. A sensor in accordance with claim 1, wherein the sensor measures the variable selected from the group consisting of a pressure, an angle, a rotation, an inclination, a length, a distance, a noise, a brightness, a moisture, a direction, a level and a combination thereof.

13. A sensor comprising:
    a sensor housing having a specimen feed to receive a medium to be detected;
    a first measured value pick-up housed in the sensor housing, the first measured value pick-up measuring a variable to obtain a first measured value;
    a second measured value pick-up housed in the sensor housing, the second measured value pick-up measuring a variable to obtain a second measured value, the first and second measured value pick-ups mounted in the specimen feed to be spaced apart from each other with a identical distance from an entry of the specimen feed;
    a first processing unit in the sensor housing, the first processing unit having a first input and a first output, the first input receiving the first measured value from the first measured value pick-up;
    a second processing unit in the sensor housing, the second processing unit having a second input and a second output, the second input receiving the second measured value from the second measured value pick-up, the first and second processing units coupled to each other via a signal connection in the sensor housing to communicate the first and second measured value pick-ups; and
    a secondary sensor detecting a disturbance variable caused by an environment and transmitting a detected value of the disturbance variable to at least one of the first and second processing units so that disturbance on the sensor is compensated by the measured value provided by the secondary sensor;

wherein at least one of the first processing unit and the second processing unit further has a comparing unit to compare the first measured value with the second measured value, the first processing unit and the second processing unit store one of the first and second measured value in the first output and the second output when a deviation of the compared first and second measured values is within a preset tolerance limit, and mark one of the first and second measured value as faulty and store the marked value from the first or second output when a deviation of the compared first and second measured values is not within the preset tolerance limit.

14. The sensor of claim 13, wherein the variable is selected from the group consisting of pressure, angle, rotation, inclination, length, distance, noise, brightness, moisture, direction and level.

15. The sensor of claim 13, wherein the first and second processing units are coupled to a bus system.

16. The sensor of claim 13, wherein the first measured value-pick-up is mounted to face the second measured value-pick-up in the specimen feed.

17. The sensor of claim 15, wherein the first and second processing units work on the basis of a common clock source.

* * * * *